United States Patent
Kondrutskii et al.

(10) Patent No.: US 11,505,632 B2
(45) Date of Patent: Nov. 22, 2022

(54) SOLID EXTRACTING AGENT WITH HIGH DYNAMIC EXCHANGE CAPACITY FOR EXTRACTION OF SCANDIUM AND METHOD OF ITS PRODUCTION

(71) Applicants: JOINT-STOCK COMPANY «AXION—RARE-EARTH AND NOBLE METALS», Perm (RU); FEDERAL STATE AUTONOMOUS EDUCATIONAL INSTITUTION OF HIGHER EDUCATION «URAL FEDERAL UNIVERSITY NAMED AFTER THE FIRST PRESIDENT OF RUSSIA B.N. YELTZIN, Ekaterinburg (RU); JOINT-STOCK COMPANY «DALUR», S. Uksyanskoe (RU)

(72) Inventors: Dmitrii Alekseevich Kondrutskii, Volzhsky (RU); Vladimir Nikolaevich Rychkov, Berezovsky (RU); Evgenii Vladimirovich Kirillov, Ekaterinburg (RU); Sergey Vladimirovich Kirillov, Ekaterinburg (RU); Grigory Mikhailovich Bunkov, Ekaterinburg (RU); Evgenii Sergeevich Vostrov, Perm (RU); Vitalii Aleksandrovich Tretiakov, Perm (RU); Gadzhi Rabadanovich Gadzhiev, Volzhsky (RU); Nikolai Anatolevich Poponin, Ekaterinburg (RU); Denis Valerevich Smyshliaev, Uksyanskoe (RU)

(73) Assignees: JOINT-STOCK COMPANY AXION—RARE EARTH AND NOBLE METALS, Perm (RU); FEDERAL STATE AUTONOMOUS EDUCATIONAL INSTITUTION OF HIGHER EDUCATION URAL FEDERAL UNIVERSITY NAMED AFTER THE FIRST PRESIDENT OF RUSSIA B.N. YELTSIN, Ekaterinburg (RU); JOINT-STOCK COMPANY DALUR, S. Uksyanskoe (RU)

(*) Notice: Subject to any disclaimer, the term of this patent is extended or adjusted under 35 U.S.C. 154(b) by 430 days.

(21) Appl. No.: 16/615,943

(22) PCT Filed: Jun. 28, 2018

(86) PCT No.: PCT/RU2018/050070
§ 371 (c)(1),
(2) Date: May 8, 2020

(87) PCT Pub. No.: WO2019/009768
PCT Pub. Date: Jan. 10, 2019

(65) Prior Publication Data
US 2020/0270721 A1 Aug. 27, 2020

(30) Foreign Application Priority Data

Jul. 7, 2017 (RU) ................................ 2017124151

(51) Int. Cl.
*C22B 3/24* (2006.01)
*C22B 59/00* (2006.01)
(Continued)

(52) U.S. Cl.
CPC .......... *C08F 212/08* (2013.01); *C08F 212/36* (2013.01); *C08J 3/092* (2013.01);
(Continued)

(58) Field of Classification Search
CPC ........... C22B 3/24; C22B 59/00; C08K 5/521; C08F 212/08; C08J 3/092
See application file for complete search history.

(56) References Cited

U.S. PATENT DOCUMENTS

| 9,133,100 B2 * | 9/2015 | Sakaki ................. C07C 231/02 |
| 9,539,569 B2 | 1/2017 | Tret'jakov et al. |
| 2010/0003176 A1 | 1/2010 | Huang et al. |

FOREIGN PATENT DOCUMENTS

| CN | 1127791 A | 7/1996 |
| CN | 102011010 A | 4/2011 |

(Continued)

OTHER PUBLICATIONS

Oct. 18, 2018, International Search Report and Written Opinion, PCT/RU2018/050070.

*Primary Examiner* — Robert D Harlan
(74) *Attorney, Agent, or Firm* — Banner & Witcott, Ltd.

(57) ABSTRACT

The invention relates to a composition and method for producing a solid extracting agent for extraction of scandium from sulfuric acid solutions.

There is provided a solid extracting agent (Solex) for extraction of scandium from scandium-containing solutions comprising a styrene-divinylbenzene matrix with di-(2-ethylhexyl) phosphoric acid. The extracting agent further comprises tri-n-octylphosphine oxide, tributyl phosphate, isododecane, in the following ratio of components, wt. %: di-(2-ethylhexyl) phosphoric acid 32.0-37.5, tri-n-octylphosphine oxide 4.2-8.0, tributyl phosphate 0.8-1.7, isododecane 16.7-20.0, the remainder styrene-divinylbenzene, with the styrene/divinylbenzene ratio in the matrix equal to 75-80 to 20-25 wt. %. There is also provided a method of producing the Solex. The technical result is the production of a scandium-selective Solex with a high dynamic exchange capacity.

6 Claims, No Drawings

(51) Int. Cl.
  *C08F 212/36* (2006.01)
  *C08F 212/08* (2006.01)
  *C08J 3/09* (2006.01)
  *C22B 3/42* (2006.01)
  *C08K 5/14* (2006.01)
  *C08K 5/521* (2006.01)
  *C08K 5/5313* (2006.01)

(52) U.S. Cl.
  CPC ............... *C22B 3/42* (2013.01); *C22B 59/00* (2013.01); *C08J 2325/08* (2013.01); *C08K 5/14* (2013.01); *C08K 5/521* (2013.01); *C08K 5/5313* (2013.01)

(56) References Cited

FOREIGN PATENT DOCUMENTS

| | | | |
|---|---|---|---|
| CN | 103068793 A | | 4/2013 |
| CN | 106521153 A | | 3/2017 |
| CN | 10-6702180 A | * | 5/2017 |
| CN | 106702180 A | | 5/2017 |
| RU | 2063458 C1 | | 7/1996 |
| RU | 2008144647 A | | 5/2010 |
| RU | 2417267 C1 | | 4/2011 |
| RU | 2487184 C1 | | 7/2013 |
| RU | 2531916 C1 | | 10/2014 |
| RU | 2612107 C2 | | 3/2017 |
| RU | 2613246 C1 | | 3/2017 |
| WO | 2008101396 A1 | | 8/2008 |
| WO | 2017074921 A1 | | 5/2017 |

* cited by examiner

SOLID EXTRACTING AGENT WITH HIGH DYNAMIC EXCHANGE CAPACITY FOR EXTRACTION OF SCANDIUM AND METHOD OF ITS PRODUCTION

CROSS-REFERENCE TO RELATED APPLICATIONS

This application is a U.S. National Stage application under 35 U.S.C. § 371 of International Application PCT/RU2018/050070 (published as WO 2019/009768 A1), filed Jun. 28, 2018, which claims the benefit of priority to Application RU 2017124151, filed Jul. 7, 2017. Benefit of the filing date of these prior applications is hereby claimed. Each of these prior applications is hereby incorporated by reference in its entirety.

The invention relates to a composition and method for producing a solid extracting agent for extraction of scandium from sulfuric acid solutions in the extraction processes of hydrometallurgical production after extraction of uranium, nickel, copper or other metals, when they are produced by in-situ leaching.

Currently, phosphorus-containing ion exchange resins, impregnated sorbents (impregnates) and solid extracting agents (Solex) are known to be used for extraction of scandium. At the same time, ion exchange resins, impregnates and Solexes have both inherent advantages and disadvantages.

A method of producing a sorbent for selective extraction of scandium ions with a spatially obstructed group of a-hydroxyphosphonic acid by acylation of a styrene copolymer with divinylbenzene in the presence of Friedel-Crafts catalyst, followed by phosphorylation of the acylated copolymer with phosphorus trichloride, is disclosed in RU 2531916, 26.04.2013. The resulting sorbent has a much higher affinity for scandium than for iron (III).

The disadvantage of this sorbent production method is its low capacity in the extraction of scandium due to the low degree of accessibility of functional groups due to steric hindrances created by the polymer matrix, and also due to the significant sorption of uranium and thorium ions from sulfate solutions, which makes it difficult to use the resulting sorbent for extraction of scandium from solutions containing uranium and thorium.

Polymer impregnated sorbents (impregnates) containing an extracting agent and a polymer resin are known to be used for extraction of rare-earth metals, including scandium, from leaching solutions. Extracting agent may be cationic, anionic or non-ionic. Polymer resin may be free of functional groups or contain sulfo, carboxyl, iminodiacetic, phosphoric acid or amino groups. The method of producing impregnated sorbents involves saturating a polymer resin in an extracting agent solution, filtering out the extracting agent-saturated resin from the solution, and drying the extracting agent-saturated resin to remove solvent residues (WO 2017074921, 05.04.2017).

The disadvantage of the impregnated polymeric sorbents produced by impregnating polymer resins with an extracting agent solution is the high tendency of elution of the extracting agent into the mobile phase in the use of the sorbents, which reduces the sorbent service life and leads to undesirable formation of a tail that contaminates the starting solutions and the resulting scandium concentrates with the extracting agent.

At present, the most promising sorbents for extraction of scandium from productive sulfuric acid solutions are solid extracting agents (Solex). Comparative study has been carried out on the selectivity of Solexes with various extracting agents with respect to scandium contained in the sulfuric acid solution for leaching uranium ores. Characteristics of such Solexes containing, as extracting agents, di-2-ethylhexylphosphoric acid, di-(2,4,4-trimethylpentyl) phosphinic acid, aminomethylphosphonic acid, obtained by copolymerization of these extracting agents in a mixture with styrene and divinylbenzene have been studied. The studies led to the conclusion that Solexes based on di-2-ethylhexylphosphoric acid have a high selectivity and capacity to scandium in the pH range of return solution of 1.1-2.0, which can reduce the consumption of reagents for pH adjustment, ensure a high degree of extraction, and produce a cleaner end scandium solution sent for production of a commercial compound (RU 2417267, 17.09.2009; RU 2613246, 09.06.2016; RU 2612107, 22.07.2015).

Based on the analysis of the prior art, it seems promising to synthesize Solex sorbents for extraction of scandium on the basis of di-2-ethylhexylphosphoric acid, which are quite acceptable by the complex of characteristics (price, scandium sorption pH, capacity and selectivity) for production needs.

The prior art most closely related to the present invention in terms of technical essence and the achieved result is a method of producing a sorbent (Solex) for selective extraction of scandium, comprising: preparing a starting mixture of components, containing an organophosphorus compound (di-2-ethylhexylphosphoric acid), a polymerization initiator, styrene and divinylbenzene; vigorously stirring the mixture and holding with subsequently raising the temperature to 90° C., and holding at this temperature while stirring; cooling the reaction mixture; filtering, washing and drying the resulting product (RU 2487184, 03.11.2011).

The main disadvantages of the prior art sorbent and method for producing the same include the low dynamic exchange capacity associated with the formation of closed micropores in the synthesis process and the absence of macropores, leading to low sorption kinetics, and, therefore, dynamic exchange capacity, as well as the high cost and low commercial availability of crown ethers (dibenzo-18-crown-6), which complicates the use of the sorbent and its production method on the industrial scale, and makes the commercial process of extraction of scandium from solutions of in-situ leaching, e.g. uranium ores, unprofitable.

The object of the present invention is to provide a sorbent (Solex) with a high dynamic exchange capacity for extraction of scandium and an easily implemented method of its production. The high dynamic exchange capacity enables conducting the process of sorption of scandium under specific loads of 10 or more column volumes per hour and reducing the amount of resin charged into the column, which in turn leads to increasing the specific quantity of scandium gathered during desorption per unit volume of resin, thereby positively affecting the profitability of the process of extraction of scandium from in-situ leaching solutions.

The object is attained by a method of producing a solid extracting agent (Solex) for extraction of scandium from scandium-containing solutions, comprising: preparing a mixture of starting components, containing an organophosphorus compound based on di-2-ethylhexylphosphoric acid, styrene and divinylbenzene; dispersing the mixture in 0.7% aqueous starch solution while vigorously stirring the mixture; holding the mixture with subsequently raising the temperature to 90° C. and holding at this temperature while stirring; cooling the reaction mixture; washing the product, and further adding, to the mixture of styrene, divinylbenzene, and di-2-ethylhexylphosphoric acid, tri-n-octylphosphine oxide, tributyl phosphate, isododecane, benzoyl peroxide, in the following ratio of components, wt. %:

| | |
|---|---|
| di-(2-ethylhexyl) phosphoric acid | 8.74-9.93 |
| tri-n-octylphosphine oxide | 1.10-2.18 |
| tributyl phosphate | 0.22-0.44 |
| benzoyl peroxide | 0.22-0.25 |
| isododecane | 4.41-5.46 |
| 0.7% aqueous starch solution | 72.48-73.26 |
| styrene | 8.03-8.48 |
| divinylbenzene | 2.12-2.68, | said increasing of the temperature being performed at a rate of 0.5° C./min, said holding being performed at 80° C. for 5 hours, and said holding at 90° C. being performed for 2 hours.

Current patent and scientific literature does not disclose a solid extracting agent for extraction of scandium from scandium-containing solutions with the inventive quantitative ratio of components, neither a method of its production.

The technical result is achieved within the scope of the above set of features owing to the fact that the process carried out under the inventive conditions provides the formation of open macropores owing to the use of isododecane, which exhibits stratifying properties for the monomer-polymer mixture in course of polymerization, and the necessary internal pore space is created; tri-n-octylphosphine oxide and tributyl phosphate act as intermediates that increase the rate of complex formation of di-2-ethylhexylphosphoric acid with scandium, whereby the kinetics and dynamic exchange capacity of Solex are increased.

Without being limited to a specific theory, the following can be assumed.

Isododecane is a good solvent for styrene and divinylbenzene, however, does not dissolve styrene-divinylbenzene polymer, which precipitates from the homogeneous mixture during the synthesis process and leads to aggregation of the extracting agent solution into micro droplets that subsequently form macropores granules improving the kinetics of scandium sorption. On the other hand, the addition of tri-n-octylphosphine oxide and tributyl phosphate also changes the surface tension coefficient at the polymer/monomer mixture interface, leading to the formation of a polymer structure that is more penetrating to the scandium-containing solution compared to the closest prior art method. After synthesis, the solvent residues in the Solex granules have a positive effect on the sorption kinetics due to the decreased viscosity of di-2-ethylhexylphosphoric acid and the increased mobility of functional groups, which positively affects the rate of formation of complex compounds with scandium ions. Another possible explanation for the positive effect of the addition of tri-n-octylphosphine oxide and tributyl phosphate compounds on the sorption kinetics and the dynamic exchange capacity is their polarizing effect, leading to a decrease in the energy of complex formation of scandium with di-2-ethylhexylphosphoric acid, which increases the rate of absorption of scandium by Solex.

In the closest prior art method the produced Solex is a polymer with a gel structure of the matrix, having no free internal volume, which reduces the dynamic exchange capacity.

Unlike the prior art method, the Solex resulting from the present method has a free internal volume. To form the internal pore space, isododecane is added to the reaction mass.

All of the aforesaid fundamentally distinguishes the Solex resulting from the inventive method and the method of its production from the prior art Solex and the method of production the same.

The present method can be carried out as follows.

A dispersion medium (0.7% starch solution in distilled water) is prepared in a container provided with a cooler and a mechanical stirrer with vigorously stirring and heating to 90° C. and then cooling to 55° C. at a rate of 1° C./min.

A polymerization mixture is prepared in a separate container provided with a cooler and a mechanical stirrer by successively mixing, with the stirrer running, styrene, divinylbenzene, benzoyl peroxide, di-2-ethylhexylphosphoric acid, tri-n-octylphosphine oxide, tributyl phosphate and isododecane. Contents of the flask are mixed until a homogeneous, transparent, yellowish solution is obtained.

Suspension polymerization of the reaction mixture to obtain granules of the solid extracting agent is carried out in the container, where the dispersion medium was earlier prepared. Synthesis is carried out in the following ratio of components, wt. %:

| | |
|---|---|
| di-(2-ethylhexyl) phosphoric acid | 8.74-9.93 |
| tri-n-octylphosphine oxide | 1.10-2.18 |
| tributyl phosphate | 0.22-0.44 |
| benzoyl peroxide | 0.22-0.25 |
| isododecane | 4.41-5.46 |
| 0.7% aqueous starch solution | 72.48-73.26 |
| styrene | 8.03-8.48 |
| divinylbenzene | 2.12-2.68 |

With the stirrer running, the polymerization mixture is poured in a thin stream into the dispersion medium at the temperature of 55° C. Therewith, the mixture is gradually broken into droplets of 1.5-2.0 mm in size. Stirring at this temperature is carried out for 10 minutes. Then, the mixture is heated, with the stirrer running, according to the following scheme: heating from 55° C. to 80° C. with a rate of 0.5° C./min, holding at 80° C. for 5 h, heating up to 90° C. with a rate of 0.5° C./min, holding at this temperature for 2 h.

Then, the reaction mass is cooled to the temperature of 40° C., the stirrer is turned off, and the reaction mass is let to split into two layers: an upper layer with solid extracting agent granules and a lower layer with spent dispersion medium. The lower layer is decanted, while the upper layer with solid extracting agent granules is washed from starch residues with deionized water while stirring for 1-2 minutes, then the stirrer is turned off, and the flask contents are let to split into two layers. The step of decanting the lower layer and washing the solid extracting agent granules is repeated in the same way three times.

The resulting solid extracting agent is dispersed by wet sieving on 0.63-1.6 mm sieves.

The resulting solid extracting agent comprises white granules 0.63-1.6 mm in size, in the following ratio of components, wt. % (in terms of dry product):

| | |
|---|---|
| di-(2-ethylhexyl) phosphoric acid | 32.0-37.5 |
| tri-n-octylphosphine oxide | 4.2-8.0 |
| tributyl phosphate | 0.8-1.7 |
| isododecane | 16.7-20.0 |
| styrene divinylbenzene | the remainder, | with the styrene/divinylbenzene ratio in the matrix equal to 75-80 to 20-25 wt. %.

Below are given particular examples, not limiting, but only illustrating the feasibility of the invention.

Example 1. A dispersion medium (0.7% starch solution) is prepared in a three-necked, 5-liter flask that is provided with a cooler and a mechanical stirrer and immersed into a heated bath. To this end, 2.59 liters of distilled water is charged and heated to 90° C. Further, with the stirrer running, 2.02 g of starch suspension in 300 ml of water is charged. The material is stirred for 10 minutes and cooled to 55° C. at a rate of 1° C./min.

A polymerization mixture is prepared separately, in a three-necked, 2-liter flask provided with a cooler and a mechanical stirrer. With the stirrer running, 0.3205 kg of styrene (without removing the inhibitor), 0.1068 kg of divinylbenzene (without removing the inhibitor), 0.0087 kg of benzoyl peroxide, 0.3488 kg of di-2-ethylhexylphosphoric acid, 0.0872 kg of tri-n-octylphosphine oxide, 0.0087 kg of tributyl phosphate and 0.218 kg of isododecane are sequentially mixed. The flask contents are mixed until a homogeneous, transparent, yellowish solution is obtained.

Suspension polymerization of the reaction mixture is carried out to obtain solid extracting agent granules in the three-necked, 5-liter flask, where the dispersion medium was earlier prepared. Synthesis is carried out in the following ratio of components, wt. %:

| | |
|---|---|
| di-(2-ethylhexyl) phosphoric acid | 8.74 |
| tri-n-octylphosphine oxide | 2.18 |
| tributyl phosphate | 0.22 |
| benzoyl peroxide | 0.22 |
| isododecane | 5.46 |
| 0.7% aqueous starch solution | 72.48 |
| styrene | 8.03 |
| divinylbenzene | 2.68 |

With the stirrer running, the polymerization mixture obtained in the three-necked, 2-liter flask is poured, in a thin stream, into the dispersion medium at 55° C. Therewith, the mixture is gradually broken into droplets of 1.5-2.0 mm in size. Stirring at this temperature is carried out for 10 minutes. Next, the mixture is heated, with the stirrer running, according to the following scheme: heating from 55° C. to 80° C. at a rate of 0.5° C./min, holding at 80° C. for 5 h, heating to 90° C. at a rate of 0.5° C./min, holding at this temperature for 2 h.

Next, the reaction mass in the three-necked, 5-liter flask is cooled to a temperature of 40° C., the stirrer is turned off and the reaction mass is let to split into two layers: an upper layer with solid extracting agent granules and a lower layer with spent dispersion medium. The lower layer is decanted, and the upper layer with solid extracting agent granules is washed with 2.5 kg of deionized water from starch residues while stirring for 1-2 minutes, then the stirrer is turned off and the flask contents are let to split into two layers. The step of decanting the lower layer and washing the solid extracting agent granules is repeated in the same way three times.

The resulting solid extracting agent is dispersed by wet sieving on 0.63-1.6 mm sieves. The yield of solid extracting agent is 1.1 kg.

The resulting solid extracting agent comprises white granules of 0.63-1.6 mm in size, in the following ratio of components, wt. % (in terms of dry product):

| | |
|---|---|
| di-(2-ethylhexyl) phosphoric acid | 32.0 |
| tri-n-octylphosphine | 8.0 |
| tributyl phosphate | 0.8 |
| isododecane | 20.0 |
| styrene divinylbenzene | 39.2, | with the styrene/divinylbenzene units ratio in the matrix equal to 75:25.

Example 2. A dispersion medium (0.7% starch solution) is prepared in a three-necked, 5-liter flask, which is provided with a cooler and a mechanical stirrer and immersed in a heated bath. To this end, 2.59 liters of distilled water is charged and heated to 90° C. Then, with the stirrer running, 2.02 g of starch suspension in 300 ml of water is charged. The material is stirred for 10 minutes and cooled to 55° C. at a rate of 1° C./min.

A polymerization mixture is prepared separately, in a three-necked, 2-liter flask provided with a cooler and a mechanical stirrer. With the stirrer running, 0.3348 kg of styrene (without removing the inhibitor), 0.0837 kg of divinylbenzene (without removing the inhibitor), 0.0099 kg of benzoyl peroxide, 0.3924 kg of di-2-ethylhexylphosphoric acid, 0.0436 kg of tri-n-octylphosphine oxide, 0.01774 kg of tributyl phosphate and 0.1744 kg of isododecane are successively mixed. The flask contents are mixed until a homogeneous, transparent, yellowish solution is obtained.

Suspension polymerization of the reaction mixture is carried out to obtain solid extracting agent granules in the three-necked, 5-liter flask, where the dispersion medium was earlier prepared. Synthesis is carried out in the following ratio of components, wt. %:

| | |
|---|---|
| di-(2-ethylhexyl) phosphoric acid | 9.93 |
| tri-n-octylphosphine oxide | 1.10 |
| tributyl phosphate | 0.44 |
| benzoyl peroxide | 0.25 |
| isododecane | 4.41 |
| 0.7% aqueous starch solution | 73.26 |
| styrene | 8.48 |
| divinylbenzene | 2.12 |

With the stirrer running, the polymerization mixture obtained in the three-necked, 2-liter flask is poured in a thin stream into the dispersion medium at 55° C. Therewith, the mixture is gradually broken into droplets of 1.5-2.0 mm in size. Stirring is carried out at this temperature for 10 minutes. Next, the mixture is heated with the stirrer running according to the following scheme: heating from 55° C. to 80° C. at a rate of 0.5° C./min, holding at 80° C. for 5 h, heating to 90° C. at a rate of 0.5° C./min, holding at this temperature for 2 h.

Next, the reaction mass in the three-necked, 5-liter flask is cooled to a temperature of 40° C., the stirrer is turned off and the reaction mass is let to split into two layers: an upper layer with solid extracting agent granules and a lower layer with spent dispersion medium. The lower layer is decanted, and the upper layer with solid extracting agent granules is washed with 2.5 kg of deionized water from starch residues while stirring for 1-2 minutes, then the stirrer is turned off and the flask contents are let to split into two layers. The step of decanting the lower layer and washing the solid extracting agent granules is repeated in the same way three times.

The resulting solid extracting agent is dispersed by wet sieving on 0.63-1.6 mm sieves. The yield of solid extracting agent is 1.0 kg.

The resulting solid extracting agent comprises white granules 0.63-1.6 mm in size, in the following ratio of components, wt. % (in terms of dry product):

| | |
|---|---|
| di-(2-ethylhexyl) phosphoric acid | 37.5 |
| tri-n-octylphosphine oxide | 4.2 |
| tributyl phosphate | 1.7 |
| isododecane | 16.7 |
| styrene-divinylbenzene | 39.9, | with the styrene/divinylbenzene units ratio in the matrix equal to 80:20.

Below is the study of properties of the obtained Solex in respect of the dynamic exchange capacity for scandium.

Determination of dynamic exchange capacity for scandium.

Tests of sorbents obtained in Examples 1 and 2 were carried out in dynamic conditions of sorption of scandium from sulfate solution simulating the in-situ leaching solution of uranium ore. The composition of the sulfate solution, mg/l: Na—1568.2; K—122.4; B—22.1; Ca—487.4; Mg—412.5; Al—1191.2; Mo—1.2; Fe—91110.2; V—21.0; Sc—0.7; Y—7.3; La—3.8; Ce—9.8; Pr—1.5; Nd—6.7; Sm—1.5; Eu—0.4; Gd—1.6; Tb—0.2; Dy—1.2; Ho—0.2; Er—0.6; Tm—0.1; Yb—0.5; Lu—0.1; U—1.4; Th—1.7; P—4.9; $H_2SO_4$—7500. pH=1.3-1.4.

The laboratory setup used in the tests was comprised of a peristaltic pump, a container of at least 5 cu dm capacity with a starting solution, a glass column with an inner diameter of 7±1 mm and a height of 120±5 mm, into the lower part of which a porous glass plate was sealed in, impermeable to Solex grains and having a low filtering resistance, and a receptacle.

Experiments were carried out according to the following method.

Solex is metered with a measuring cylinder of 10 cu cm in volume, with compacting it several times by tapping the bottom of the cylinder on a wooden surface, to achieve the sorbent volume of 2.7 cu cm in the measuring cylinder. Solex is quantitatively transferred to the column (the ratio of the column diameter to the height of the Solex charge layer is 1:10) using distilled water acidified to pH=1.8. The Solex layer is locked to prevent it from floating up during the test by compacting the layer with fluoroplastic chips from above. Care should be taken to ensure that no air bubbles are trapped between granules. Excess solution is drained from the column to leave a solution volume of 10-15 mm above the sorbent layer.

A solution supply hose is connected to the upper section of the column. The pump is activated with the working solution flow rate set for saturation to 10 column volumes per hour (27 ml/h). Supply of the working solution is turned on. Portions of filtrate are taken every two hours with their volume measured with an accuracy of 0.1 cu cm. Samples are taken from each filtrate portion and from the starting solution, and the appearance of scandium in the filtrates is monitored in the course of the experiment. The experiment ends when scandium breakthrough equal to 10% of the starting concentration of scandium appears in the filtrate.

The dynamic exchange capacity for scandium DEC(Sc) (mg/cu cm) is calculated from the sample analysis results using the formula:

$$DEC = \frac{V_1 \cdot C(Sc)_{start}}{V_C}$$

where $V_1$ is the total volume of the working scandium-containing solution passed through the column with sorbent until the filtrate reaches 10% of the starting concentration of scandium in the solution, cu dm;

$C(Sc)_{start}$ is the concentration of scandium in the starting working solution, mg/cu dm;

$V_c$ is the volume of sorbent in the column, cu cm.

According to the experimental results, DEC(Sc) for Solex from Examples 1 and 2 was 2.0 and 1.8 mg/cu cm, respectively, which is 2.6-2.8 times higher than DEC(Sc) for Solex in the closest prior art (0.7 mg/cu cm).

Therefore, studies carried out by the inventors have shown that Solex obtained in accordance with the present method provides an increased dynamic exchange capacity when extracting scandium from sulfate solutions. Furthermore, the Solex production method is easy to implement, and the Solex itself is commercially applicable for extraction of scandium from solutions of in-situ leaching of uranium ores.

The invention claimed is:

1. A solid extracting agent for extraction of scandium from scandium-containing solutions, the solid extracting agent comprising (i) a matrix of styrene-divinylbenzene, (ii) an organophosphorus compound based on di-2-ethylhexylphosphoric acid, and (iii) the compounds tri-n-octylphosphine oxide, tributyl phosphate, and isododecane, wherein weight percentages in the solid extracting agent are as follows:

| | |
|---|---|
| di-(2-ethylhexyl) phosphoric acid | 32.0-37.5 |
| tri-n-octylphosphine oxide | 4.2-8.0 |
| tributyl phosphate | 0.8-1.7 |
| isododecane | 16.7-20.0 |
| styrene divinylbenzene | the remainder, | and further wherein a ratio of styrene: divinylbenzene in the matrix is from 3:1 to 4:1.

2. A method of producing a solid extracting agent for extraction of scandium from scandium-containing solutions, the method comprising: preparing a polymerization mixture comprising an organophosphorus compound based on di-2-ethylhexylphosphoric acid, styrene and divinylbenzene; dispersing the polymerization mixture in a dispersion medium comprising an aqueous starch solution while stirring to form a reaction mixture; raising the temperature of the reaction mixture while stirring; and cooling the reaction mixture to recover the solid extracting agent, wherein weight percentages in the reaction mixture are as follows:

| | |
|---|---|
| di-(2-ethylhexyl) phosphoric acid | 8.74-9.93 |
| tri-n-octylphosphine oxide | 1.10-2.18 |
| tributyl phosphate | 0.22-0.44 |
| benzoyl peroxide | 0.22-0.25 |
| isododecane | 4.41-5.46 |
| aqueous starch solution | 72.48-73.26 |
| styrene | 8.03-8.48 |
| divinylbenzene | 2.12-2.68. |

3. The method of claim 2, wherein the aqueous starch solution comprises 0.7% by weight starch.

4. The method of claim 2, wherein, in the step of raising the temperature, the reaction mixture is heated to at least 90° C.

5. The method of claim 4, wherein, in the step of raising the temperature, the reaction mixture is held at an intermediate temperature of less than 90° C.

6. The method of claim 5, wherein, in the step of raising the temperature, the reaction mixture is heated at 0.5° C./min to 80° C., held at 80° C. for 5 hours, heated to 90° C., and held at 90° C. for 2 hours.

* * * * *